United States Patent [19]

Marler

[11] Patent Number: 5,197,167
[45] Date of Patent: Mar. 30, 1993

[54] TRIM FASTENINGS

[75] Inventor: Albert C. Marler, Solihull, United Kingdom

[73] Assignee: Jaguar Cars Limited, United Kingdom

[21] Appl. No.: 830,116

[22] Filed: Jan. 31, 1992

[30] Foreign Application Priority Data

Feb. 12, 1991 [GB] United Kingdom ............... 9102869

[51] Int. Cl.⁵ ............................................. A44B 21/00
[52] U.S. Cl. ...................................... 24/296; 24/289; 24/458
[58] Field of Search ................. 24/296, 297, 291, 292, 24/293, 294, 295, 289, 453, 458; 296/146 F, 39.2; 49/462; 52/718.1

[56] References Cited

U.S. PATENT DOCUMENTS

| 2,137,653 | 11/1938 | Lundberg | 24/458 |
| 2,137,883 | 11/1938 | Ross | 24/458 |
| 2,287,606 | 6/1942 | Eady | 52/718.1 |
| 2,659,951 | 11/1953 | Tinnerman | 52/718.1 |
| 2,938,249 | 5/1960 | Milne | 24/296 |
| 3,251,105 | 5/1966 | La Penna | 24/296 |
| 3,331,171 | 7/1967 | Hallock | 52/718.1 |
| 3,897,967 | 8/1975 | Barenyi | 52/718.1 |
| 3,916,055 | 10/1975 | Wagner | |

FOREIGN PATENT DOCUMENTS

| 182173 | 11/1905 | Fed. Rep. of Germany . | |
| 3203705 | 10/1982 | Fed. Rep. of Germany . | |
| 3530253 | 3/1986 | Fed. Rep. of Germany | 24/289 |
| 0191851 | 9/1985 | Japan | 24/289 |

Primary Examiner—Victor N. Sakran
Attorney, Agent, or Firm—Davis, Bujold & Streck

[57] ABSTRACT

A fastening for securing a trim panel to a support panel includes an elongate element defining a plurality of transverse detent members spaced along its length, the elongate element being secured to the trim panel with the detent members spaced from the trim panel on the inside thereof, a plurality of clips are provided on the support panel, each clip corresponding to one of the detent members, the clips having a surface diverging away from the support panel for engagement of the detent members, so that movement of the trim panel longitudinally of the elongate member will cause each detent member to engage and move along the surface of a clip, the detent members and trim panel being drawn towards the support panel.

4 Claims, 3 Drawing Sheets

TRIM FASTENINGS

BACKGROUND TO THE INVENTION

The present invention relates to trim fastenings and in particular to fastenings for trim panels for vehicles, for example, the door trim panels of motor vehicles.

Conventional door trim panels in motor vehicles have been attached to the door panel by press fittings disposed around the edge of the trim panel. This presents no problem where the trim panel is flat and lies against an opposed flat surface around the edge of the door panel. The trim panel thus fitted may be removed by inserting a flat implement between the door and trim panel and levering to release the press fastenings.

In modern vehicles however, the trim panels are moulded and may wrap around the edges of the door panel. As a result, there may be no suitable position to locate press fastenings of the type used hitherto and, furthermore, it may not be possible to insert an implement between the trim and door panel to remove the trim panel.

The present invention provides a fastening suitable for use with moulded trim panels.

SUMMARY OF THE INVENTION

According to one aspect of the present invention a fastening for securing a trim panel to a support panel comprises an elongate element, said elongate element defining a plurality of transverse detent members spaced along it length, the elongate element being secured to the trim panel with the detent members spaced from the trim panel on the inside thereof. A plurality of clips being provided on the support panel, each clip corresponding to one of the detent members, the clips defining a surface for engagement by the detent member, said surface diverging away from the support panel, so that movement of the trim panel longitudinally of the elongate member will cause each detent member to move along said surface of an associated clip, the detent members and trim panel being drawn towards the support panel.

According to a preferred embodiment, the elongate element is formed from wire which is bent to form detent members, the detent members being interconnected by longitudinally extending lengths of wire. The longitudinally extending lengths of wire are secured to the trim panel in suitable manner, for example by the use of a bonding material and/or tape. The clips may be formed integrally of the support panel or separate clips made of metal or plastics material may be secured to the support panel in suitable manner.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
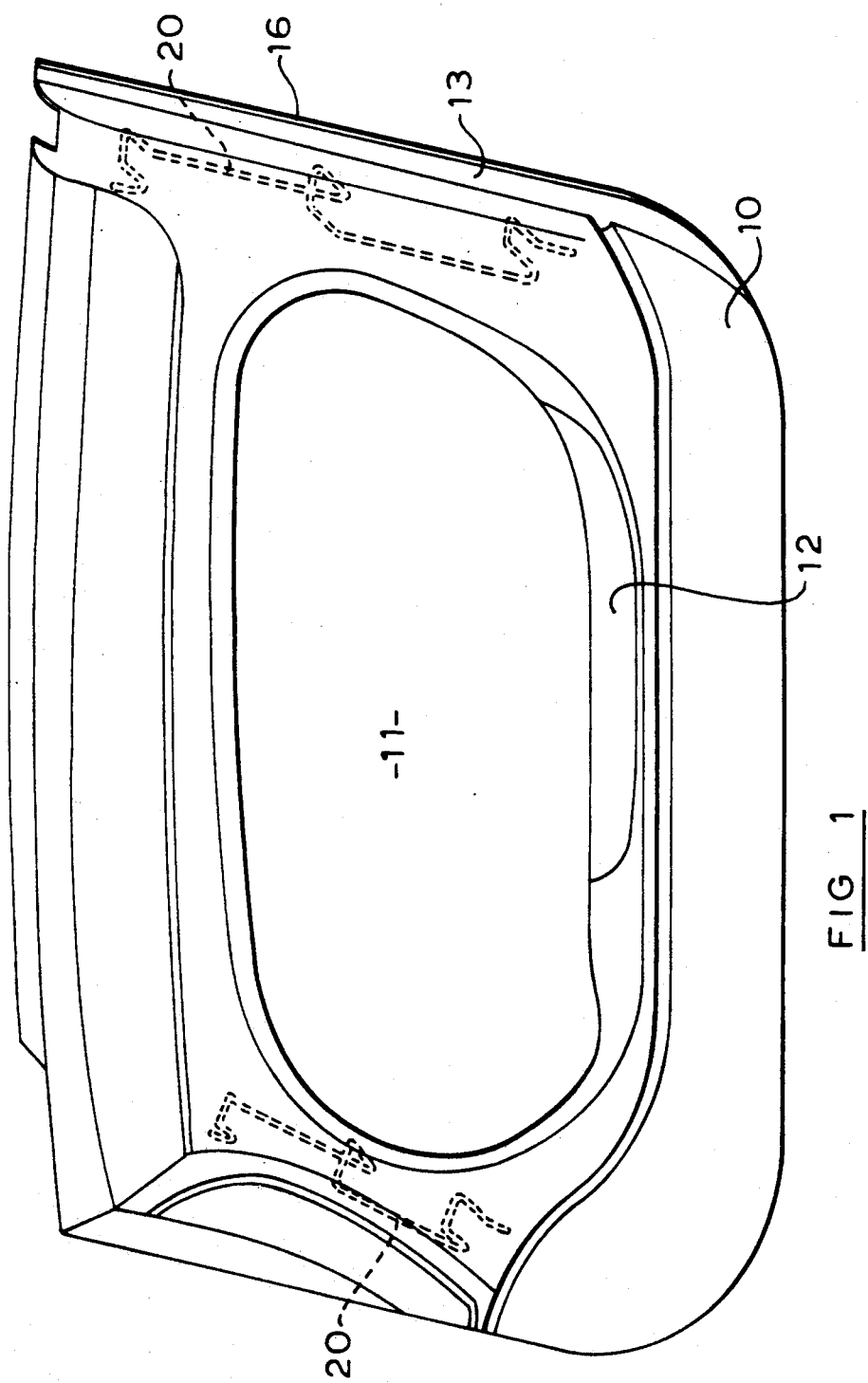
FIG. 1 illustrates a door trim panel with fastening in accordance with the present invention.

FIG. 1 illustrates a moulded door trim panel 10 for a motor vehicle. The trim panel 10 has a central recessed portion 11, providing access to a storage pocket 12 formed along the lower edge. The side and lower edges of the door have a peripheral shoulder formation 13 adapted to locate against a corresponding formation 14 on the door panel 15 (see FIG. 4), the edge 16 of the trim panel 10 extending over the edge of the door panel 15.

Figure 2:
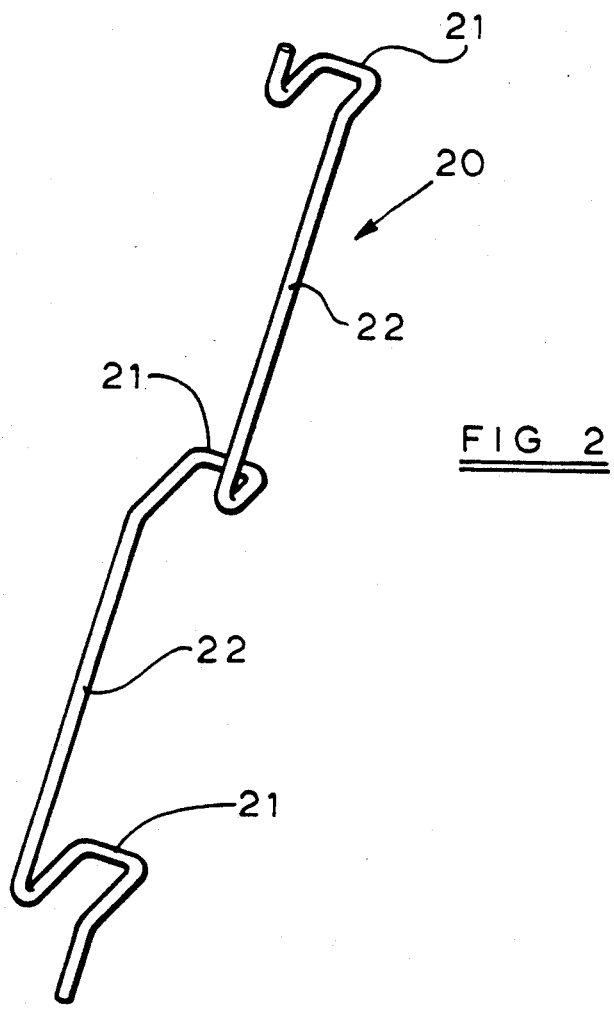
FIG. 2 illustrates in detail the elongate element adapted to be secured to the door panel illustrated in FIG. 1.
Figure 3:
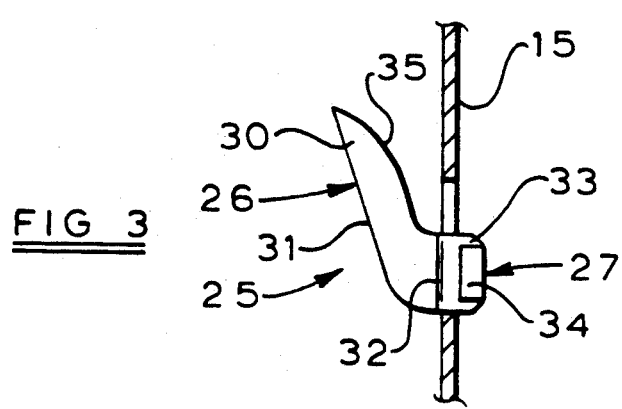
FIG. 3 illustrates a clip for use in accordance with the present invention.

Elongate elements 20, as illustrated in FIG. 2, are formed from wire bent to provide a plurality of detent members 21 interconnected by lengths of wire 22. The elongate elements 20 are secured to the inside of trim panel 10, the lengths 22 being bonded to the panel 10 by means of an adhesive compound 23 and/or tape 24.

Clips 25 are formed from sheet material bent to provide a clip formation 26 and a retaining formation 27. The clip formation 26 is of channel section having a pair of side walls 30 interconnected, remote from the retaining formation 27, by web 31. The retaining formation 27 is formed by bending the edges of walls 30 remote from web 31, outwardly to provide co-planer shoulder portions 32. The ends of the walls 30 are then bent back to provide substantially parallel leg formations 33 which extend from the shoulder formations 32 on the side thereof formations 33 are bent back to form retaining lugs 34. The edges 35 of walls 30 are inclined to provide an abutment face which diverges away from the plane of the shoulder portions 32.

Figure 4:
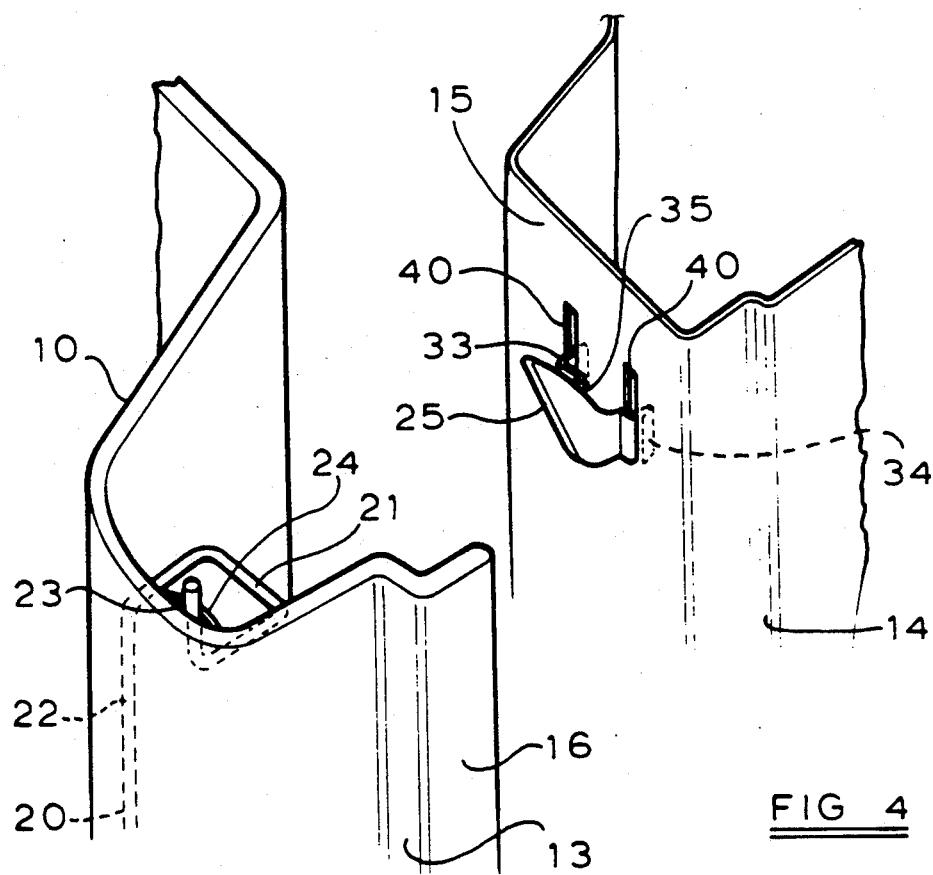
FIG. 4 shows a detailed perspective view of the trim and door panel.

As illustrated in FIG. 4, the leg formations 33 of clips 25 engage through slots 40 in the door panel 15, so that the shoulder formations 32 will engage the door panel 15 and the retaining lugs 34 will engage the opposite face of the door panel 15 to retain the clip 25 in position.

A plurality of clips 25 are secured to the door panel 15 in this manner. The clips 25 are located on the door panel 15 to correspond to the location of the detent members 21 on the trim panel 10. The trim panel 10 may thus be positioned with respect to the door panel 15, so that each abutment member 35 engages over the clip formation 26 of one of the clips 25. The trim panel 10 may then be moved relative to the door panel 15, so that the detent members 21 move along the inclined edges 35 of the clips 25. The trim panel 10 is thus drawn towards the door panel 15 until the shoulder formation 13 on the trim panel 10 engages the corresponding formation 14 on the door panel 15. This relative movement of the trim panel 10 and door panel 15 will also cause the edge 16 of trim panel 10 to locate around the edge of the door panel 15.

Figure 5:
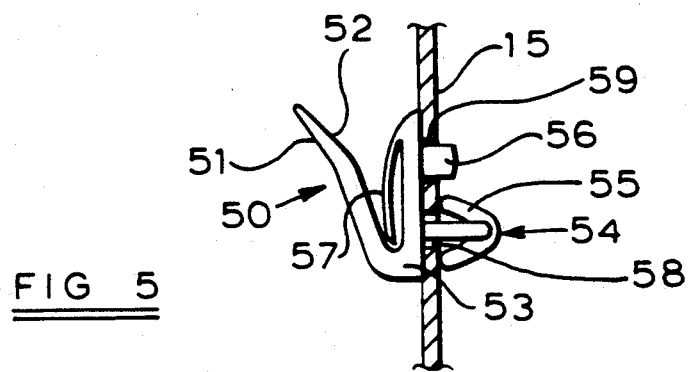
FIG. 5 shows an alternative form of clip for use in accordance with the present invention.

In the modification illustrated in FIG. 5, the clip 50 is moulded from a plastics material. The clip 50 has a clip formation 51 with inclined abutment face 52 and a base portion 53. The base portion is adapted to locate against the door panel, a retaining formation 54 extending through an aperture 58 in the door panel 15, the retaining formation 54 having formations 55 which will engage the door panel on the side thereof remote from the base portion 53. A spigot formation 56 is also provided on the base portion 53 to locate in a second aperture 59 in the door panel 15 to prevent rotation of the clip 50 with respect to the door panel 15.

A resilient leaf formation extends from the free end of the base portion 53 towards the junction between the base portion 53 and clip formation 51.

The plastic clips 50 will act in similar manner to the metal clips 25 described above, the detent members 21 engaging and moving along the face 52 of clip formation 51. The resilient leaf formation 57 will apply a load to the detent members 21 to retain the detent member in position while the trim panel 10 is fitted but permitting release of the detent member 21 for removal of the trim panel 10.

Various modifications may be made without departing from the invention. For example, while in the embodiments described above the elongate elements are formed from wire, elements of other constructions may be used. For example, the elongate element may be of ladder configuration having a pair of parallel longitudinal members which are secured to the trim panel, the detent members extending between the longitudinal members, out of the plane thereof. Also, the clips may be formed integrally of the support panel by, for example, pressing tabs out of the support panel, so that the tabs diverge away from the plane of the support panel.

I claim:

1. A fastening for securing a trim panel to a support panel comprising an elongate element, said elongate element being formed from wire, the wire being bent transversely of the elongate element to form a plurality of detent members spaced along the length of the elongate member, the detent members being interconnected by longitudinally extending lengths of wire, the longitudinally extending lengths of wire being adapted to be secured to the trim panel so that the detent member are spaced away from the trim panel on the inside thereof, a plurality of clips being provided on the support panel, each clip corresponding to one of the detent members, the clips defining a surface for engagement by the detent member, said surface diverging away from the support panel, so that movement of the trim panel longitudinally of the elongate member will cause each detent member to move along said surface of an associated clip, the detent members and trim panel being drawn towards the support panel.

2. A fastening according to claim 1 in which the elongate element is secured to the trim panel by means of an adhesive composition.

3. A fastening according to claim 1 in which the clips are formed integrally of the support panel.

4. A fastening according to claim 1 in which the clips have means by which they may be secured to the support panel at suitable locations.

* * * * *